United States Patent [19]

Winnington et al.

[11] Patent Number: 4,791,887
[45] Date of Patent: Dec. 20, 1988

[54] BOILER WITH ROTATABLE HEAT EXCHANGER

[75] Inventors: Terence L. Winnington, Stroud; Ian W. Eames, Sheffield, both of England

[73] Assignee: Caradon Mira Limited, England

[21] Appl. No.: 78,583

[22] Filed: Jul. 27, 1987

[30] Foreign Application Priority Data

Aug. 1, 1986 [GB] United Kingdom ............... 8618899

[51] Int. Cl.⁴ .................................................. F22B 5/00
[52] U.S. Cl. ................................. 122/11; 122/367 R; 165/86; 237/1 R; 237/59
[58] Field of Search ............... 122/11, 12, 26, 367 R; 126/247; 165/86, 88, 111; 415/114, 116, 178; 237/1 R, 12.3 R, 59

[56] References Cited

U.S. PATENT DOCUMENTS

| | | | |
|---|---|---|---|
| 2,098,841 | 11/1937 | Verloop | 122/11 |
| 2,140,175 | 12/1938 | Starzinczy | 122/11 |
| 3,424,234 | 1/1969 | Ling | 165/111 |
| 3,799,120 | 3/1974 | Huettner | 122/11 |
| 3,818,871 | 6/1974 | O'Connor | 122/11 |
| 3,850,147 | 11/1974 | Doerner | 122/11 |
| 4,307,684 | 12/1981 | Morcov | 122/11 |

FOREIGN PATENT DOCUMENTS 1434790 5/1976 United Kingdom .
1532738 11/1978 United Kingdom .
2022791 12/1979 United Kingdom .

Primary Examiner—Steven E. Warner
Attorney, Agent, or Firm—Larson & Taylor

[57] ABSTRACT

A boiler has a gas burner assembly and a heat exchanger positioned in a combustion chamber for heating water circulated through the heat exchanger by heat exchange with the combustion products. The performance of the heat exchanger is improved by rotating the heat exchanger to prevent formation of a boundary layer of cooler combustion products and/or a surface film of condensed moisture on the heat exchange surface.

20 Claims, 5 Drawing Sheets 4,791,887

BOILER WITH ROTATABLE HEAT EXCHANGER

BACKGROUND OF THE INVENTION

This invention relates to boiler.

Boilers comprising a heat exchanger and a gas or oil burner assembly for heating a fluid, usually water, circulated through the heat exchanger are well known.

Such boilers are commonly used in hot water and central heating systems where the heat exchanger is connected in a circuit passing through a storage cylinder for the hot water supply and the desired number of space heating devices.

With the increase in cost of gas and oil, considerable attention has been directed to improving the efficiency of such boilers to reduce running costs. For example, it is known to improve efficiency by increasing the surface area of the heat exchanger available for heat transfer and/or to construct the heat exchanger from materials having high thermal conductivities.

Neither of these methods however solves the problems caused by the formation of a boundary layer of cooler slower moving combustion products at the heat exchange surface or of a film of condensed moisture on the heat exchange surface both of which have an insulating effect and reduce the efficiency.

Furthermore, both methods increase manufacturing costs while many of the high thermal conductivity materials are susceptible to attack by the moisture and hot acidic gases contained in the combustion products causing a build-up of corrosion deposits on the heat exchange surface which reduce efficiency and result in eventual failure of the heat exchanger.

It is an object of the present invention to provide a boiler which mitigates at least some of the drawbacks afore-mentioned.

SUMMARY OF THE INVENTION

According to the present invention there is provided a boiler having a heat exchanger through which fluid to be heated is circulated in use, a burner assembly for heating the circulating fluid and, means for rotating the heat exchanger.

By rotating the heat exchanger, cooler slower moving combustion products at the heat exchange surface are replaced by hotter combustion products and moisture which condenses on the heat exchange surface is removed.

More specifically, rotation of the heat exchanger increases the relative velocity between the heat exchange surface and the combustion products causing high shear and turbulence of the combustion products thereby preventing formation of a boundary layer of cooler slower moving combustion products at the heat exchange surface. In addition rotation of the heat exchanger causes moisture which condenses on the heat exchange surface to flow to the outer peripheral edge of the heat exchanger from where it is thrown off thereby preventing formation of a condensate film on the heat exchange surface.

As a result, the heat exchange surface is not subjected to the insulating effects of a boundary layer of cooler slower moving combustion products or a surface film of condensed moisture, thereby improving the efficiency of the heat exchanger.

This improved efficiency is obtained without increasing the heat exchange surface area and permits use of materials for the heat exchange surface which are resistant to attack by the moisture and hot acidic gases contained in the combustion products.

Preferably the burner assembly is mounted in an enclosure providing a combustion chamber and the heat exchanger is rotatably mounted in the combustion chamber between the burner assembly and an outlet in an end wall of the combustion chamber for removing the combustion products from the combustion chamber.

The burner assembly and heat exchanger are preferably of similar shape, for example annular, and a front surface of the heat exchanger is blackened or otherwise adapted for effective absorption of the radiant heat emitted by the combustion process.

Conveniently the peripheral edge of the heat exchanger is located in a channel in a side wall of the enclosure in which condensate thrown off the heat exchanger is collected. Preferably a duct opens into the channel for draining collected condensate from the channel.

Preferably the flow of combustion products from the front surface of the heat exchanger to the outlet is confined at the peripheral edge and rear surface to a narrow gap between the heat exchanger and the side and end walls of the enclosure. Advantageously, the end wall is provided with means, for example vanes extending radially or otherwise shaped, to promote air movement in the gap and which may be tipped with wiper means, for example brushes, to break the boundary layer on the heat exchanger.

The heat exchanger preferably comprises annular axially spaced front and rear walls having a diameter several times greater than the axial separation to provide a large outer surface area to internal volume ratio for effective heat exchange with the combustion products.

Preferably the heat exchanger is internally divided into front and rear chambers by a radial partition wall which terminates short of the peripheral edge to leave an annular gap connecting the chambers.

Conveniently the rear wall and partition wall are formed with central openings connected to corresponding one ends of concentric outer and inner tubes extending through the outlet and the corresponding other ends of the tubes are rotatably received in and sealed relative to a stepped bore of a mounting block formed with separate fluid passages opening into each tube. In this way fluid may be circulated through the heat exchanger with simultaneous rotation of the heat exchanger.

Preferably the fluid passages in the mounting block are connected to a main supply manifold having inlet and outlet couplings for the circulation of fluid. Advantageously the inlet coupling is connected to the water passage opening into the outer tube and the outlet coupling is connected to the water passage opening into the inner tube. In this way the flow of fluid through the heat exchanger is in the opposite direction to the flow of combustion products over the heat exchange surface.

Advantageously the means for rotating the heat exchanger comprises an electric motor having an output shaft carrying a drive pinion connected to a driven pinion fast with the outer tube, for example by an endless belt.

The burner assembly may comprise a single burner but more preferably the burner assembly consists of a plurality of separate burners to which the supply of a suitable fuel, for example gas or oil, is controlled by valve means in such a way as to permit the selective operation of the burners to vary the energy output of the burner assembly as desired.

Where the burner assembly is fuelled by gas, the or each burner preferably comprises a radiant plaque which emits the energy of the combustion process in approximately equal amounts of radiant heat and heat contained in the combustion products. Advantageously the or each burner is also of the fully pre-mixed type ensuring complete combustion of the gas without over dilution of the combustion products.

Preferably the burner assembly and heat exchanger are contained in a sealed casing having a balanced flue including an exhaust duct connected to the outlet for discharge of the combustion products and providing an inflow of air for the combustion process. The air inflow may be controlled by a fan which is conveniently driven by the means for rotating the heat exchanger. Alternatively, the fan may control the discharge of the combustion products in the exhaust duct.

The exemplary embodiments of a boiler according to this invention are shown in the accompanying drawings wherein:

DETAILED DESCRIPTION OF THE EXEMPLARY EMBODIMENTS

Figure 1:
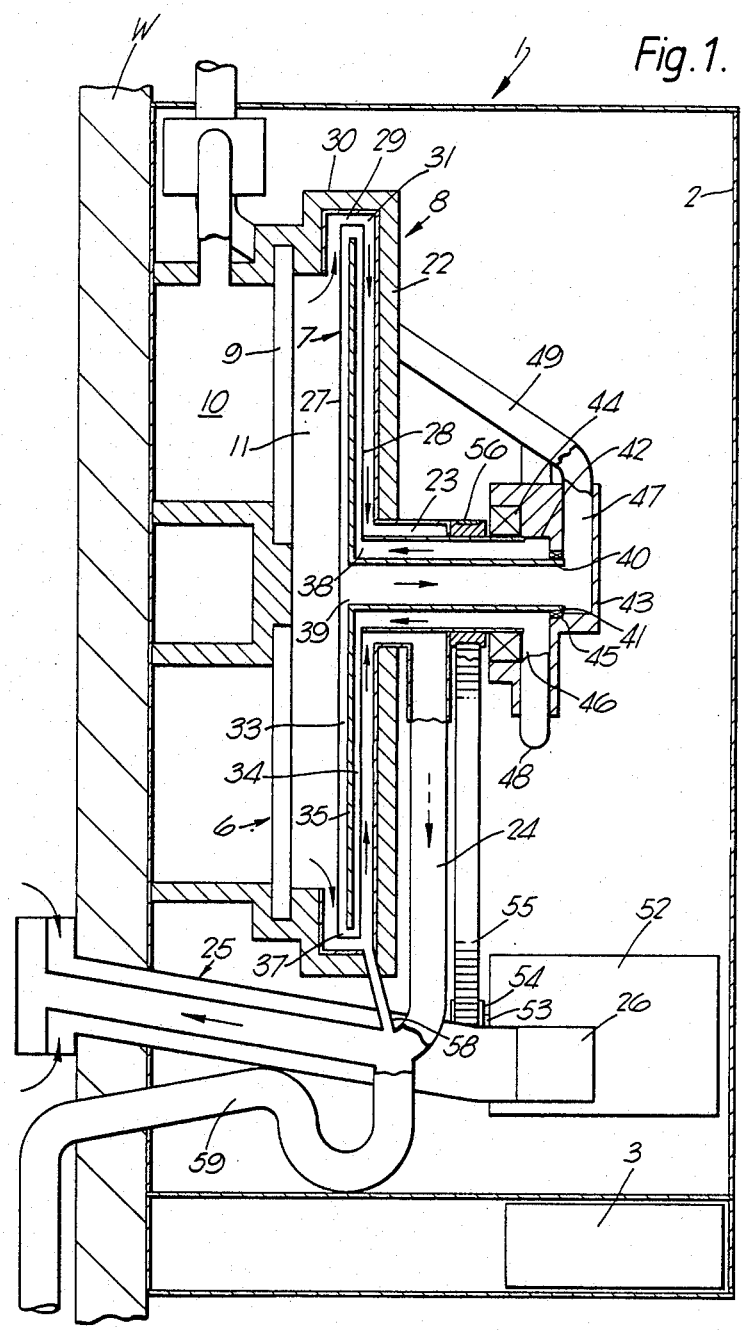
FIG. 1 is a side view, partly in section, of a boiler according to the present invention.
Figure 2:
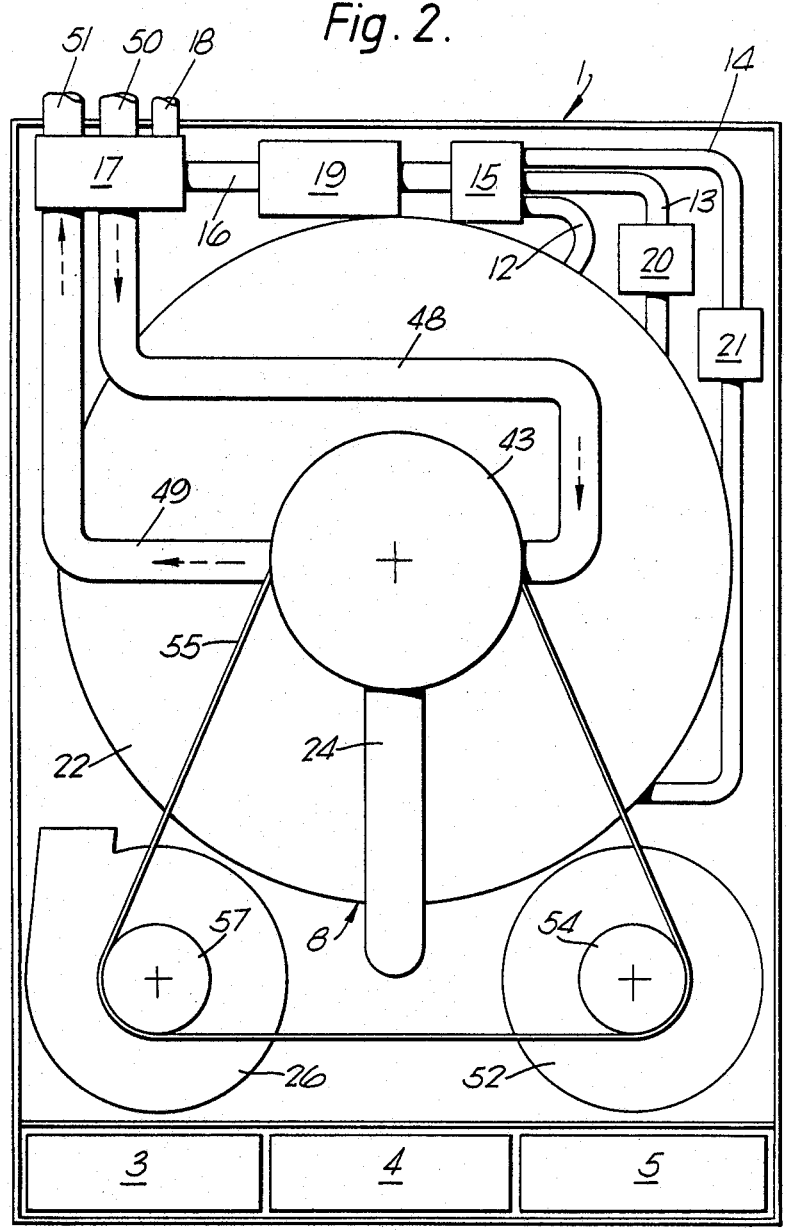
FIG. 2 is a front view of the boiler shown in FIG. 1 with the front of the casing removed to show the internal components.
Figure 3:
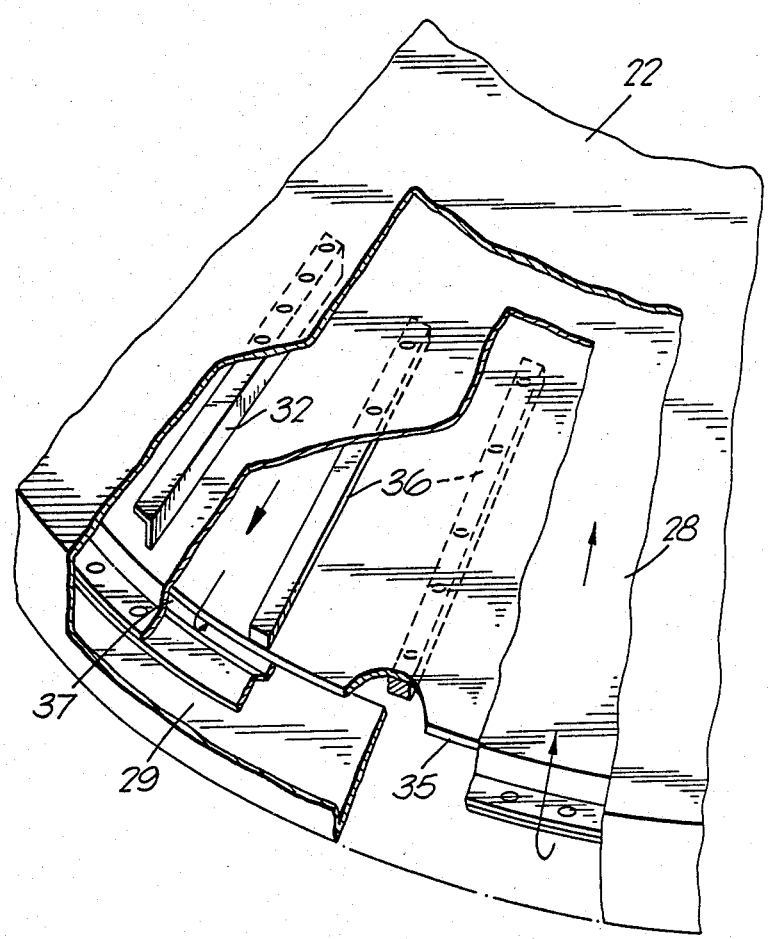
FIG. 3 is a detail perspective view, partly broken away for clarity, of part of the heat exchanger.
Figure 4:
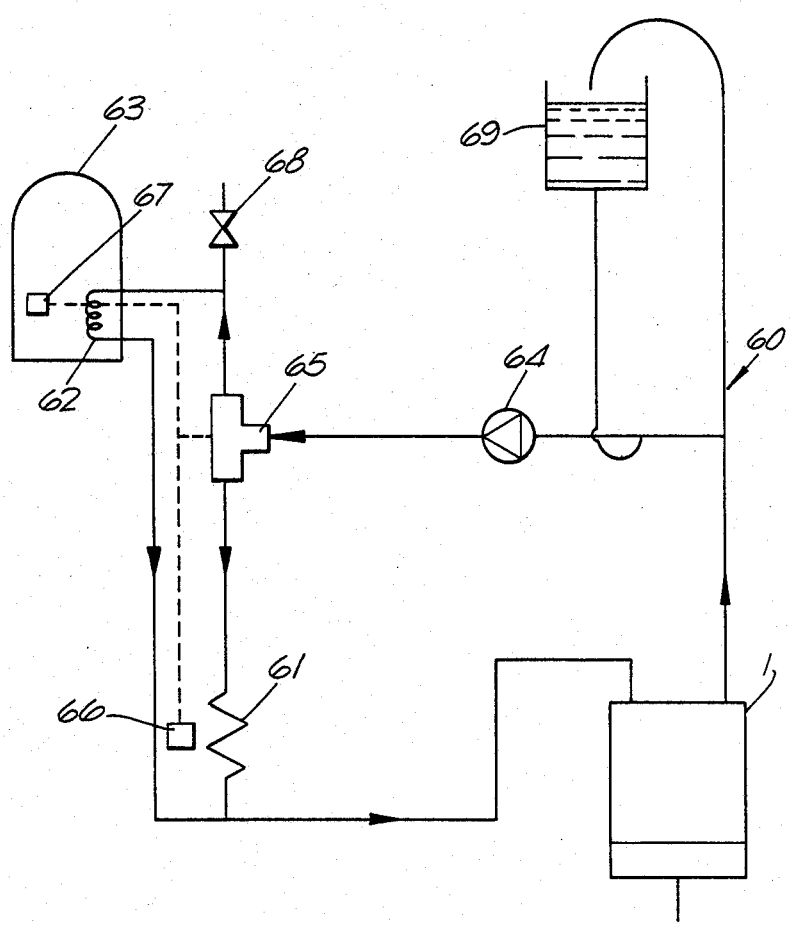
FIG. 4 is a schematic illustration of a hot water and central heating system incorporating the boiler shown in FIGS. 1 to 3.

Referring to the accompanying drawings, there is shown in FIGS. 1 to 3 a boiler 1 according to the present invention and in FIG. 4 a hot water and central heating system incorporating the boiler 1.

The boiler 1, shown mounted on an external wall W, has a sealed rectangular outer casing 2 below which are mounted the ignition, temperature and timer controls 3,4 and 5 respectively for controlling operation of the boiler in use. The controls 3,4 and 5 may be of any suitable type known to those skilled in the art and no further description is deemed necessary for understanding of the present invention.

Located in the casing are an annular gas burner assembly 6 and an annular heat exchanger 7 through which water to be heated by the energy of the combustion process is circulated in use of the boiler 1.

The burner assembly 6 is mounted in an insulated enclosure 8 and is split radially into three separate burners 9. The enclosure 8 is shaped on one side of the burner assembly 6 to provide a respective mixing chamber 10 to ensure an even and homogeneous gas/air mixture for each burner 9 and, on the other side of the burner assembly 6, to provide an annular combustion chamber 11 in which the heat exchanger 7 is rotatably mounted coaxial with and spaced from the burner assembly 6.

Each mixing chamber 10 is connected by a respective pipe 12,13,14 to a common burner manifold 15 which in turn is connected by a single pipe 16 to a main supply manifold 17 which has a gas inlet coupling 18 for connection to a suitable gas supply.

A main gas control valve 19 located in the pipe 16 controls the ga supply to the burner manifold 15. From the burner manifold 15 the gas supply to the mixing chamber 10 of the burner 9 associated with pipe 12 is uninterrupted while that to the mixing chambers 10 of the burners 9 associated with pipes 13 and 14 is controlled by respective solenoid valves 20,21 located in the pipes 13,14. By this arrangement, selective operation of the valves 20,21 permits one, two or three burners 9 to be used depending on the required energy output of the burner assembly 6.

Disposed centrally in an end wall 22 of the enclosure 8 on the opposite side of the heat exchanger 7 to the burner assembly 6 is an outlet 23 connected to an exhaust duct 24 for removing the products of combustion from the combustion chamber 11. The exhaust duct 24 leads to a balanced flue 25 arranged to extend through the external wall W for discharging the combustion products to atmosphere and providing an inflow of air under the control of a fan 26 for entrainment in the gas supply to the burner assembly 6 for the combustion process.

Each burner 9 comprises a radiant plaque which emits the energy of the combustion process in approximately equal amounts of radiant heat and heat contained in the combustion products and is of the fully pre-mixed type which ensures the correct amount of air is present for the complete combustion of the gas thereby avoiding the production of high concentrations of carbon monoxide or the over-dilution of the combustion products. In this way safe and efficient operation of the burner assembly 6 is obtained.

The heat exchanger 7 comprises axially spaced apart front and rear walls 27 and 28 respectively joined at the outer peripheral edge by welding. The walls 27,28 are made of stainless steel to resist attack by the moisture and hot acidic gases contained in the combustion products and in this way the efficiency of the heat exchanger 7 is not reduced by the build-up of corrosion products on the outer surface.

Stainless steel is the preferred material for the walls 27,28 as it combines resistance to corrosion with high strength enabling the walls 27,28 to be relatively thin without risk of rupturing under the pressure of the circulating fluid. However, any other suitable corrosion resistant materials may be used for the walls 27,28.

The walls 27,28 have a diameter several times greater than the axial separation to provide a large outer surface area to internal volume ratio for effective heat exchange with the combustion products and the outer surface of the front wall 27 facing the burner assembly 6 is blackened for effective absorption of the radiant heat emitted by the combustion process.

The rear wall 28 of the heat exchanger 7 is spaced a small distance from the end wall 22 of the enclosure 8 and the outer peripheral region of the heat exchanger 7 is located in an annular channel 29 formed in the side wall 30 of the enclosure 8. By this arrangement the flow of the combustion products from the front of the heat exchanger 7 to the outlet 23 is confined at the peripheral edge and rear of the heat exchanger 7 to a narrow gap 31 between the heat exchanger 7 and the side and end walls 30 and 22 respectively of the enclosure 8. In addition the end wall 22 is provided with a number of circumferentially spaced apart radially extending vanes 32 in the gap 31 for a purpose to be described later.

The heat exchanger 7 is internally divided into front and rear chambers 33 and 34 respectively by a radially extending internal partition wall 35 made of stainless steel and attached on opposed sides to the front and rear walls 27 and 28 respectively by radial spacers 36 offset relative to one another in the circumferential direction. The partition wall 35 terminates short of the peripheral edge of the front and rear walls 27 and 28 respectively to leave an annular gap 37 at the peripheral edge connecting the front and rear chambers 33 and 34 respectively for circulation of water therebetween.

The rear wall 28 and partition wall 35 are formed with respective central openings 38 and 39 to which corresponding one ends of concentric outer and inner cylindrical stainless steel tubes 40 and 41 respectively are connected. The tubes 40,41 extend axially through the outlet 23 from the combustion chamber 11 and the corresponding other ends are rotatably received in and sealed relative to a stepped bore 42 of a mounting block 43 by respective annular seals 44,45.

Opening into each tube 40,41 is a respective water passage 46,47 formed in the mounting block 43. Each passage 46,47 is connected by a respective pipe 48,49 to the main supply manifold 17 which has water inlet and outlet couplings 50 and 51 respectively for circulating water through the heat exchanger 7 in the opposite direction to the flow of the combustion products over the outer surface of the heat exchanger 7 as indicated by the arrows. In this way the temperature differential between the circulating water and the combustion products is optimized for effective heat exchange with the combustion products over the entire outer surface of the heat exchanger 7.

Figure 5:
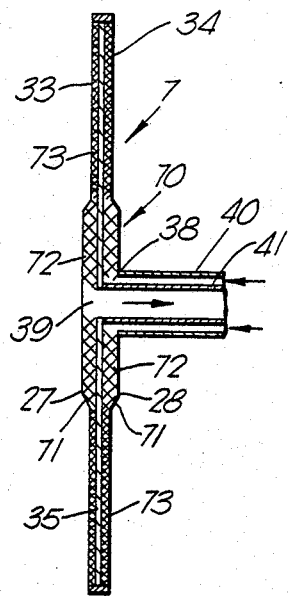
FIG. 5 is a section showing a modification to the heat exchanger shown in FIG. 1.
Figure 6:
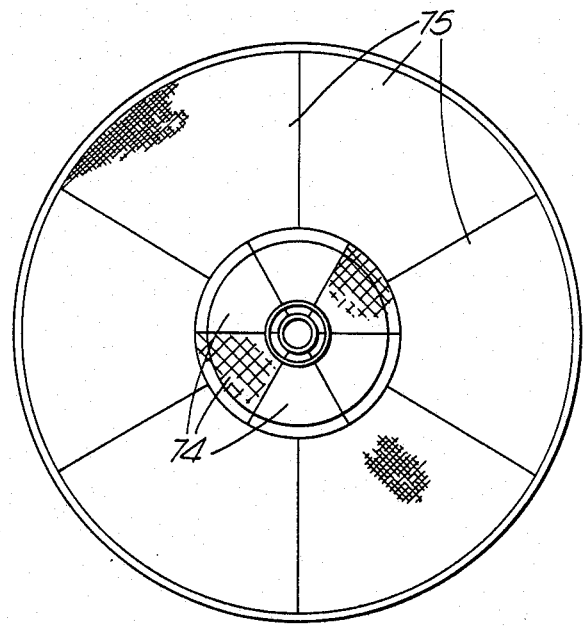
FIG. 6 is a front view of the heat exchanger shown in FIG. 5 with the front wall removed.

In a modification shown in FIGS. 5 and 6, the performance of the disc-shaped heat exchanger 7 is further enhanced by extending the surface area on the water side by the provision of copper mesh 70 in the front and rear chambers 33 and 34. The front and rear walls 27 and 28 are stepped at 71 and each chamber 33,34 contains inner and outer rings 72 and 73 respectively of copper mesh. The inner rings 72 are of increased thickness and of a different type of mesh to the outer rings 73 whereby the flow area in each chamber 33,34 is increased at the inlet to and outlet from the heat exchanger 7 so as to reduce the restriction caused by the mesh. Typical meshes are Expamet (Registered Trade Mark) 196C (2.5 mm thick for the inner rings 72 and Expamet (Registered Trade Mark) 227C (1.2 mm thick) for the outer rings 73 (Expamet 196C and Expamet 227C are available from the Expanded Metal Company Limited)

Because of the different flow characteristics of the mesh in different directions, each ring 72,73 of mesh is radially divided into six segments 74,75 respectively, each cut in the same orientation from a sheet of the appropriate type mesh and assembled with the segments 74 in the inner ring 72 staggered relative to the segments 75 in the outer ring 73 so as to ensure uniform flow.

On assembly, either the mesh 70 or the walls 27,28,35 of the heat exchanger 7 are silver plated and vacuum brazed under load to form a silver/copper eutectic bond giving a strong structure and good thermal contact between the mesh 70 and walls 27,28,35 for efficient heat transfer.

The extended surface area may be obtained by the use of metal foam in place of the copper mesh 70 above-described. Alternatively, any other surface area extension technique may be used. Additionally, reducing the conductivity of the partition wall 35, for example by the use of a low thermal conductivity material or a composite structure for the partition wall 35, may be advantageous in further improving the performance of the heat exchanger 7.

For rotating the heat exchanger 7 and operating the fan 26, an electric motor 52 is mounted in the casing 2 and has an output shaft 53 carrying a drive pinion 54 connected by an endless toothed belt 55 to a driven pinion 56 fast with the outer tube 40 and a driven pinion 57 associated with the fan 26.

Rotation of the heat exchanger 7 increases the relative velocity between the outer surface of the heat exchanger 7 and the combustion products flowing over the surface. This causes high shear and turbulence of the combustion products, especially where these are confined to the narrow gap 31 at the peripheral edge region and rear of the heat exchanger 7 where the vanes 32 are provided on the end wall 22.

As a result, the relatively cooler combustion products nearer the outer surface of the heat exchanger 7 are constantly replaced by hotter combustion products thereby improving the efficiency of the heat exchanger 7 by substantially eliminating the formation of an insulating boundary layer of relatively cooler slower moving combustion products at the outer surface of the heat exchanger 7.

Rotation of the heat exchanger 7 also ensures that any moisture in the combustion products which condenses on the outer surface of the heat exchanger 7 is thrown off thereby improving the efficiency of the heat exchanger 7 by eliminating the formation of an insulating film of condensed moisture on the outer surface of the heat exchanger 7.

Condensed moisture which is thrown off the heat exchanger 7 collects in the channel 29 and is drained through a narrow duct 58 in the bottom of the channel 29 into the exhaust duct 24. This condensed moisture is then drained along with any other moisture condensing in the exhaust duct 24 into a drain outlet 59 leading from the bottom of the exhaust duct 24 through the external wall W.

Referring now to FIG. 4, the boiler 1 is shown connected in a circuit 60 including a radiator 61 for space heating and a coil 62 for heating water contained in a storage cylinder 63 for the hot water supply.

Water heated by the boiler 1 as above-described is circulated around the circuit 60 by means of a pump 64 and a three way valve 65 controlled by thermostats 66 and 67 arranged to monitor the air and water temperatures respectively is operable to direct the flow of water to the radiator 61 and/or the coil 62 in response to the temperature sensed by the associated thermostat 66,67. In known manner the circuit 60 includes an automatic air vent 68 and a combined feed and expansion tank 69 and, while only one radiator 61 is shown it will be understood that any number of radiators may be provided as desired.

It will be understood that the invention is not limited to the construction of boiler above-described but includes all constructions in which a fluid to be heated is circulated through a rotatable heat exchanger.

We claim:

1. A boiler comprising an enclosure including a burner assembly and defining a combustion chamber, a disc-shaped heat exchanger arranged in said combustion chamber between said burner assembly and an end wall of said combustion chamber for rotation about an axis, said heat exchanger having front and rear walls defining heat exchange surfaces facing said burner assembly and said end wall respectively, turbulator means on said end wall for promoting shear and turbulence of combustion products flowing over said rear wall, means for circulating fluid to be heated through said heat exchanger, and drive means for rotating said heat exchanger relative to said turbulator means about said axis.

2. A boiler according to claim 1 wherein said front wall of said heat exchanger is blackened or otherwise adapted to absorb radiant heat emitted by said burner assembly.

3. A boiler according to claim 1 wherein said turbulator means comprises a plurality of circumferentially spaced radially extending vanes having respective wiper means for said rear wall of said heat exchanger.

4. A boiler according to claim 1 wherein said front and rear walls have a diameter several times greater than the axial separation.

5. A boiler according to claim 1 wherein said burner assembly and heat exchanger are of similar shape.

6. A boiler according to claim 1 wherein said drive means for rotating said heat exchanger is coupled to said fluid circulation means.

7. A boiler according to claim 1 wherein said heat exchanger is internally divided by a radial partition wall into front and rear chambers connected to each other at the peripheral edge of said heat exchanger and connected to said fluid circulation means at the center of said heat exchanger.

8. A boiler according to claim 7 wherein said fluid circulation means comprises concentric outer and inner tubes corresponding one ends of which are connected to said rear chamber and front chamber respectively and the corresponding other ends of which are rotatably received in and sealed relative to a stepped bore of a mounting block formed with separate fluid passages opening into said tubes and connected to a respective one of a fluid inlet and a fluid outlet.

9. A boiler according to claim 1 wherein said heat exchanger includes means for extending the effective internal heat transfer surface area.

10. A boiler according to claim 9 wherein said means comprises copper mesh.

11. A boiler according to claim 1 wherein said enclosure is mounted in a sealed casing and has an outlet in said end wall connected to an exhaust duct of a balanced flue for the discharge of said combustion products.

12. A boiler according to claim 11 wherein said flue provides an inflow of air to the casing for the combustion process.

13. A boiler according to claim 12 wherein said air inflow is controlled by a fan mounted in said casing.

14. A boiler according to claim 1 wherein said burner assembly is gas fired.

15. A boiler according to claim 14 wherein said burner assembly comprises a plurality of separate burners each connected to a common manifold for the supply of gas under the control of valve means permitting selective operation of said burners.

16. A boiler according to claim 15 wherein each burner comprises a radiant plaque.

17. A boiler according to claim 1 wherein said heat exchanger defines with a side wall of said combustion chamber a narrow gap at the peripheral edge of said heat exchanger.

18. A boiler according to claim 17 wherein said heat exchange surfaces are substantially planar.

19. A boiler according to claim 18 wherein said side wall has a drain channel in which the peripheral edge of said heat exchanger is located for collecting condensate thrown of said heat exchanger.

20. A boiler according to claim 19, wherein said drain channel is provide with a drain outlet.

* * * * *